United States Patent
Huang

[11] Patent Number: 5,993,522
[45] Date of Patent: Nov. 30, 1999

[54] COMPRESSED AIR STRAINER AND DRYING TREATMENT

[76] Inventor: Chin-Fu Huang, No. 44, Hua Chiao St. Huatan Hsiang, Changhua Hsien, Taiwan

[21] Appl. No.: 09/076,907

[22] Filed: May 13, 1998

[51] Int. Cl.$^6$ .................................................. B01D 47/14
[52] U.S. Cl. .............................. 96/294; 62/401; 62/498; 96/295; 96/300; 55/DIG. 17
[58] Field of Search ......................... 55/DIG. 17; 95/210, 95/211, 288, 42; 96/290, 294, 295, 300; 62/640, 624, 401, 498, 505

[56] References Cited

U.S. PATENT DOCUMENTS

| | | | |
|---|---|---|---|
| 2,741,899 | 4/1956 | Von Linde | 55/DIG. 17 |
| 2,955,673 | 10/1960 | Kennedy et al. | 55/DIG. 17 |
| 3,225,517 | 12/1965 | Wachsmuth | 55/DIG. 17 |
| 3,226,948 | 1/1966 | Alderson et al. | 55/DIG. 17 |
| 3,785,755 | 1/1974 | Novak et al. | 55/DIG. 17 |
| 5,261,946 | 11/1993 | Overby | 95/288 |
| 5,302,300 | 4/1994 | Porri | 95/288 |
| 5,492,461 | 2/1996 | Kitchener et al. | 55/DIG. 17 |

Primary Examiner—Duane S. Smith
Attorney, Agent, or Firm—Rosenberg, Klein & Lee

[57] ABSTRACT

A compressed air strainer and drying treatment is provided in which a filter core of the strainer can be used successively without replacement. The strainer includes a strainer main trunk, an admitting pipe stretching into the inside of the main trunk, a water intake apparatus on one side of the top end of the main trunk, and an escape pipe set on the other side of the top end connecting a heat exchanger. An automatic drainer and a manual drainer are coupled to one side of the main trunk. On another side of the main trunk, a check valve is provided and a U-shaped pipeline connects the strainer to the evaporator. The drying treatment is accomplished by splitting the inlet compressed air into many fine streams by filter baffle plates to generate innumerable small bubbles and thereby increase the contacting area between the air and the water. Oil, dirt and contaminants are carried into the air bubble and then are filtered therefrom. The air is then passed through a heat-exchanger to lower the temperature of the air. Condensed water is led back into the strainer via the U-shaped pipeline and a check valve. When the water in the strainer gets to a certain level, the automatic drainer will operate, or by opening the manual drainer, the oil, dirt and contaminants can be drained from the strainer.

7 Claims, 9 Drawing Sheets

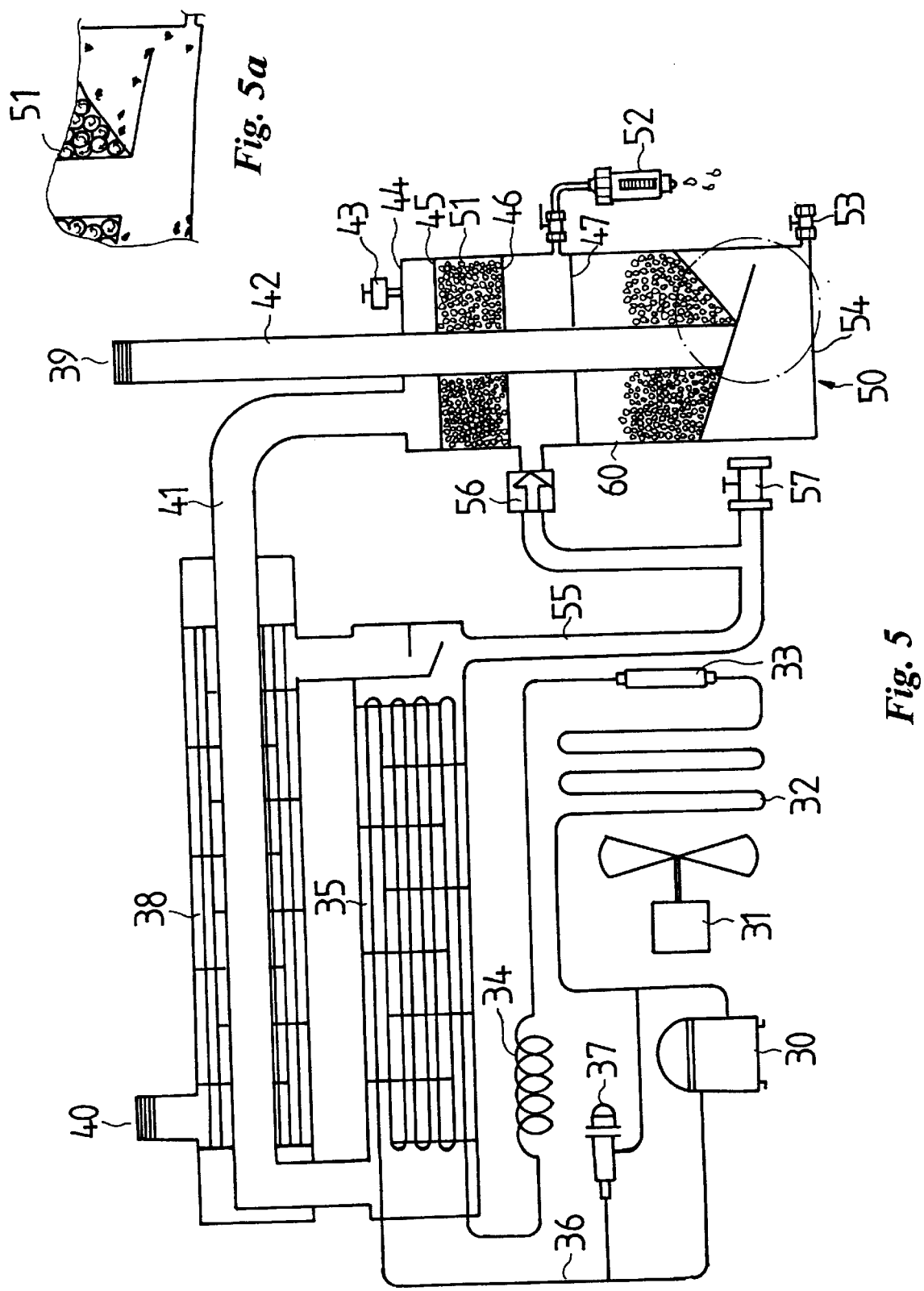

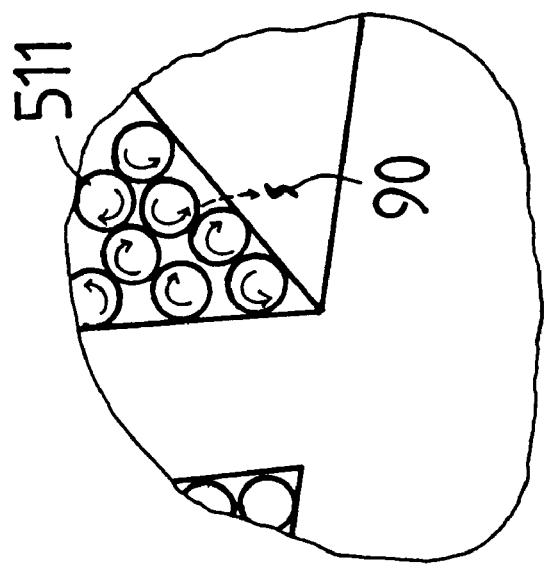
*Fig. 6a*
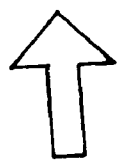
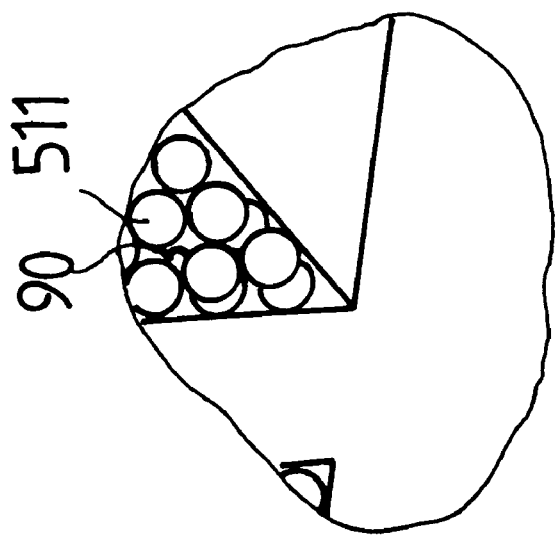
*Fig. 6*

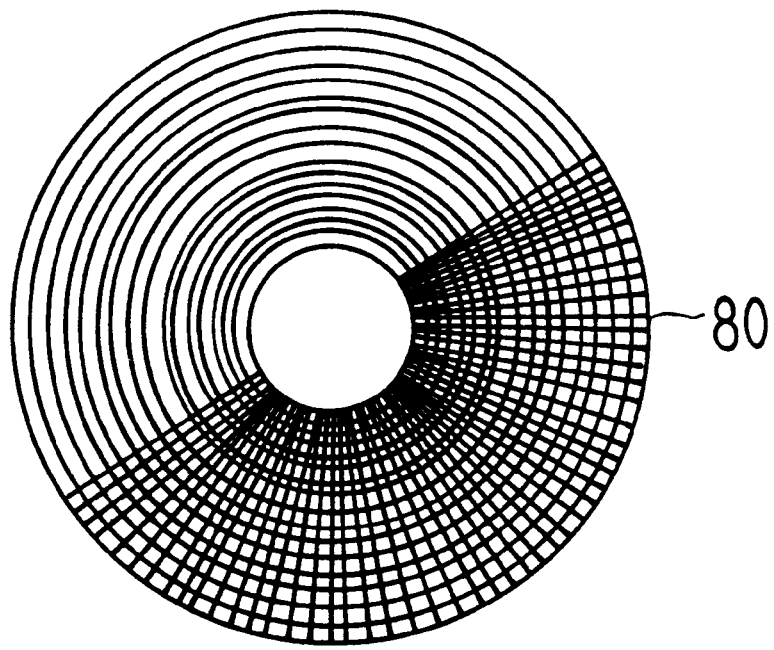
Fig. 8
Fig. 8b   Fig. 8a

COMPRESSED AIR STRAINER AND DRYING TREATMENT

BACKGROUND OF THE INVENTION

1. Field of the Invention

The present invention relates to a compressed air strainer and drying treatment. More particularly, the present invention is directed to an air strainer connected to a heat-exchanger. The compressed air is depurated by water and pills piled on baffle plates in the strainer, so that oil, dirt and other contaminants are filtered out from the raw air. Then, the moist clean air flows into the heat-exchanger to remove heat therefrom. Next, the air is output into an evaporator to be evaporated to dry the air, producing condensed water and dry clean air. The condensed water and the dry clean air are separated in a splitter, so that the condensed water flows back into the air strainer through a U-shaped pipeline. The high-purity air is made available at the outlet. The contaminants in the air strainer can be drained out with some of the water automatically or manually so as to keep the filtering medium cleaning without being fully replaced.

2. Prior Art

In accordance with modern manufacturing methods, and for the sake of lower cost, compressed air is utilized widely for operating and controlling pneumatic tools, and providing cooling, drying, cleaning, conveying and packing of professional machines, and is used for painting, decorating surface instruments and precision equipment. Therefore, high quality compressed air is now required. Because the outside air is directly drawn into the air compressor, with dirt and contaminants being drawn in together with the air. The compressor adds a lubricant to the air. The compressed air output from the air compressor, therefore, contains an oil mist, dirt, contaminants and moisture. Due to this poor quality of compressed air output, without being processed by filtering and drying treatments, the service life of the machines using the compressed air is affected.

Referring to FIG. 1, a conventional compressed air filtering and drying system is shown. An outlet of a compressor 1 connects to an air reservoir 2, and an inlet of a conventional cooling and drying apparatus 4 is linked to another port of the air reservoir 2. The outlet port of the conventional cooling and drying apparatus 4 connects to an inlet of a filter 3, and the outlet of the filter 3 provides a connecting port for connection of a pipeline, to output clean compressed air for use. As mentioned above, the poor quality air, the oil mist, dirt and contaminants carried by the air entering the air cooling and drying apparatus, will directly and seriously affect the operating efficiency and the service life of the air cooling and drying apparatus. After passing through the cooling and drying apparatus, the compressed air is purified by the filter 3 for improving the quality of air. But, after undergoing a long period of usage, the inside strainer core of the filter will be gradually blocked, restricting the flow of compressed air therethrough.

Referring additionally to FIG. 1A, the air cooling and drying apparatus includes a compressor 10, a fan motor 11, a condenser 12, a cold-producing medium filter 13, a capillary 14, an evaporator 15, a cold-producing medium return conduit 16, a hot-gas by-passing valve 17, an evaporation manometer 22, an air inlet 19, a splitter 21, an air outlet 20, an air exit manometer 23 and an automatic drainer 18. The cold-producing medium loop employs the compressor 10 to circulate the cold-producing medium via the condenser 12, the cold-producing medium filter 13, and the capillary 14 to the evaporator 15. The evaporator 15 is thereby cooled and heat is exchanged from the outside air. Then, via the cold-producing medium return conduit 16, the cold-producing medium flows back to the compressor 10 to finish one cycle. The cold-producing medium evaporation manometer is coupled to the front end of the cold-producing medium return conduit 16 for indicating the change in pressure of the cold-producing medium in the evaporating process. Meanwhile, a hot-gas by-passing valve 17 bridges between the outlet of the compressor 10 to the return conduit 16 for controlling the temperature of the cold-producing medium. The air loop makes use of the compressed air flowing into the evaporator 15, through the air inlet 19, for exchanging heat with the cold-producing medium. By means of the cooling effect of the evaporator 15, water will be condensed from the raw compressed air and cold dry air will result. Then, the condensed water is separated with the cold dry air by the splitter 21, and drained out automatically by the automatic drainer 18. Meanwhile, the cold dry air separated by the splitter is output via the air outlet 20. But, the oil mist carried in the compressed air sticks on the surface of the cold-producing medium pipelines in the evaporator 15 to form a coating, and detrimentally affects the heat exchange process, so that the heat-exchange efficiency goes down greatly.

Referring to FIG. 2, a conventional strainer, shown on the drawing, is made of a circular filter screen 24 at the core, an adhesive-bonded fabric layer 25 covering the outside of screen 24. Next, a glass fiber layer 26 is wrapped on the layer 25. Lastly, another filter screen 27 is wrapped fully around the other layers in order to block and stick the oil mist and dirt on the every layer's surface for, filtering out the clean air from the oil mist and dirt. But, along with increasing the period of usage, the oil mist and dirt attached on the filter screen piles up. Therefore, the resistance to passage of the compressed air passing through the filter screen 24 increases. If the filter screen 24 is not replaced in time, the pressure difference will rise to a level where the filter screen becomes distorted, followed by it breaking up and thereby causing the filter to lose its effectiveness.

Accordingly, the conventional compressed air filter and drying treatment have shortcomings as follows.

1. Due to the filter core of the filter consisting of a filter screen, an adhesive-bonded fabric and glass fiber, it cannot endure highly moist and higher temperature compressed air. Degradation of the filter inner core by deposition of water and destruction of the composition of the filter material by high temperatures are hard to avoid. Therefore, this kind of filter is not suitable for coupling to the inlet of the air cooling and drying apparatus for prefiltering. So, the poor quality compressed air must be directly input into the air cooling and drying apparatus will thus be a menace to the service life of the air cooling and drying apparatus.
2. When the conventional air cooling and drying apparatus processes the raw compressed air, due to a lack of pre-filtering to remove the oil mist, the oil mist will stick to the surface of the cooling medium, to form an oil coating end thereby isolating the pipeline from the compressed air, the heat-exchanging efficiency is seriously affected.
3. Along with an increase in usage time, a gradual obstruction of the filter core develops, so that the air flow rate is decreased or becomes unstable.
4. If the obstruction of the conventional filter core is so serious that, beside increasing the pressure difference of the compressed air, the filter core becomes distorted under the high pressure, if the filter core will break-up and the effectiveness of filter will be lost.

5. Because the oil and dirt that sticks to the filter core cannot be automatically removed, the user must pay careful attention on the frequency of filter core changes. Judging when the filter core should be replaced or whether it has or becomes a big problem and bother for the user.

6. The filter has to be replaced often, but frequency replacing of the filter core not only increases the production cost, but also pollutes the environment with the abandoned filter cores.

OBJECTS AND SUMMARY OF THE INVENTION

It is therefore a main object of the present invention to provide an air strainer in which the filter core does not need to be replaced, but it can be used continuously so as to reduce production costs and environmental pollution, and to output a stable, cleaned and dry air of high quality.

It is another object of the present invention to provide an air strainer in which the filter core is not affected by moisture and high temperature.

It is a further object of the present invention to provide an air strainer which can be coupled to the inlet of an air cooling and drying apparatus, to filter an oil mist from the compressed air, so as to avoid isolating the heat-exchanging between the air and a cold-producing medium, to improve drying efficiency and stability.

For achieving the above-mentioned objects, the present invention uses water as the filter material to filter the raw compressed air. The present invention employs a strainer baffle plate at the bottom of the strainer to split the air into a plurality of fine air bubbles, so as to increase the contacting area between the air and the water, in order to remove the dirt carried in the air, and floating oil removed from the air on the top surface of the water, the oil then being drained from the air strainer.

Another technique and method applied in the present invention is to set the baffle plate on an incline at the bottom of the air strainer, on which a multiplicity of fine pills are disposed so that the pills can roll in a single direction and tend to amass together, the top surface of the piled pills is substantially planar. Due to the large number of pills, when air enters the inside of the strainer, an upwardly pushing force created by the rising compressed air pushes the pills to rotate, the rolling pills displacing the contaminants carried by the air down to the bottom of the strainer.

A further technique and method applied in the present invention couples a water intake apparatus to the top end of the strainer, to supply the basic filtering water as the filter material. In operation, some of the water will be carried away by the compressed air into the air cooling and drying apparatus. The water carried by the compressed air will be combined with condensed water and fed back to the inside of the strainer by a U-shaped pipeline to recirculate and thereby save water. A check valve is coupled between the U-shaped pipeline and the strainer, to prevent the compressed air in the strainer from taking short-cut to the evaporator of the air cooling and drying apparatus.

Another technique and method applied in the present invention is to utilize the U-shaped pipeline to connect the evaporator to the strainer to guarantee that the condensed water in the evaporator flows into the strainer with ease, due to the height of the evaporator relative to the strainer. A manual draining outlet is coupled to the bottom of the U-shaped pipeline for removing precipitated filth and the remaining water therefrom to avoid creating scale or staining.

Still another technique and method applied in the present invention is to provide a cycle to free steam carried into the cleaned compressed air in the air cooling and drying apparatus, recovering it into the strainer. When the water level in the strainer reaches a predetermined level, for the automatic drainer is started to replace water for oil floating near the top surface, to keep the water quality high for cleaning and to guarantee the strainer is operating smoothly. The low-temperature condensed water is helpful to decrease the temperature of the compressed air in the strainer, so as to reduce the load on the air cooling and drying apparatus.

BRIEF DESCRIPTION OF THE DRAWINGS

FIG. 5 is a schematic illustration showing the arrangement of the pills in the strainer of the present invention;

FIG. 5A is an enlarged view showing a portion of the central bottom of the strainer of the present invention;

FIG. 6 is an enlarged view showing the filtering action of a portion of the pills in the strainer of the present invention;

FIG. 6A is an enlarged view showing the filtering action of a portion of the pills in the strainer of the present invention;

FIG. 8 is a top view showing another configuration of the screen of the present invention;

FIG. 8A is a cross-sectional view of a portion of the screen of FIG. 8;

FIG. 8B is a cross-sectional view of a screen showing another configuration thereof.

DETAILED DESCRIPTION OF THE PREFERRED EMBODIMENTS

Figure 1:
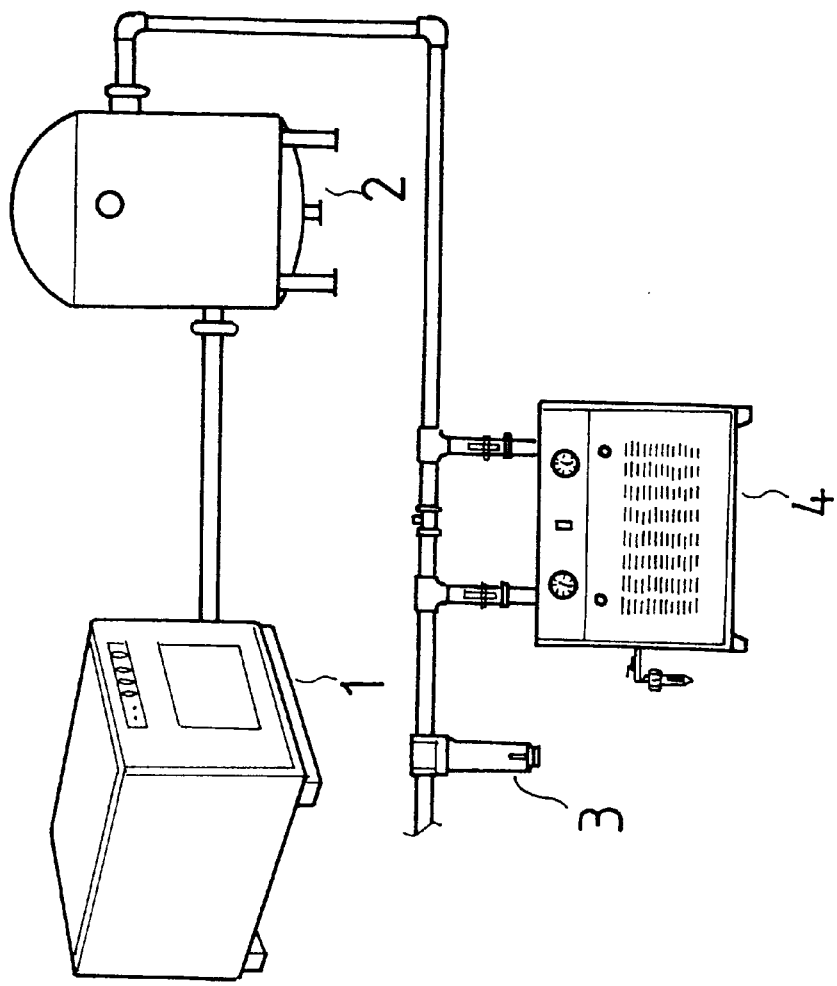
FIG. 1 is a schematic illustration showing the configuration of the conventional strainer.
Figure 1A:
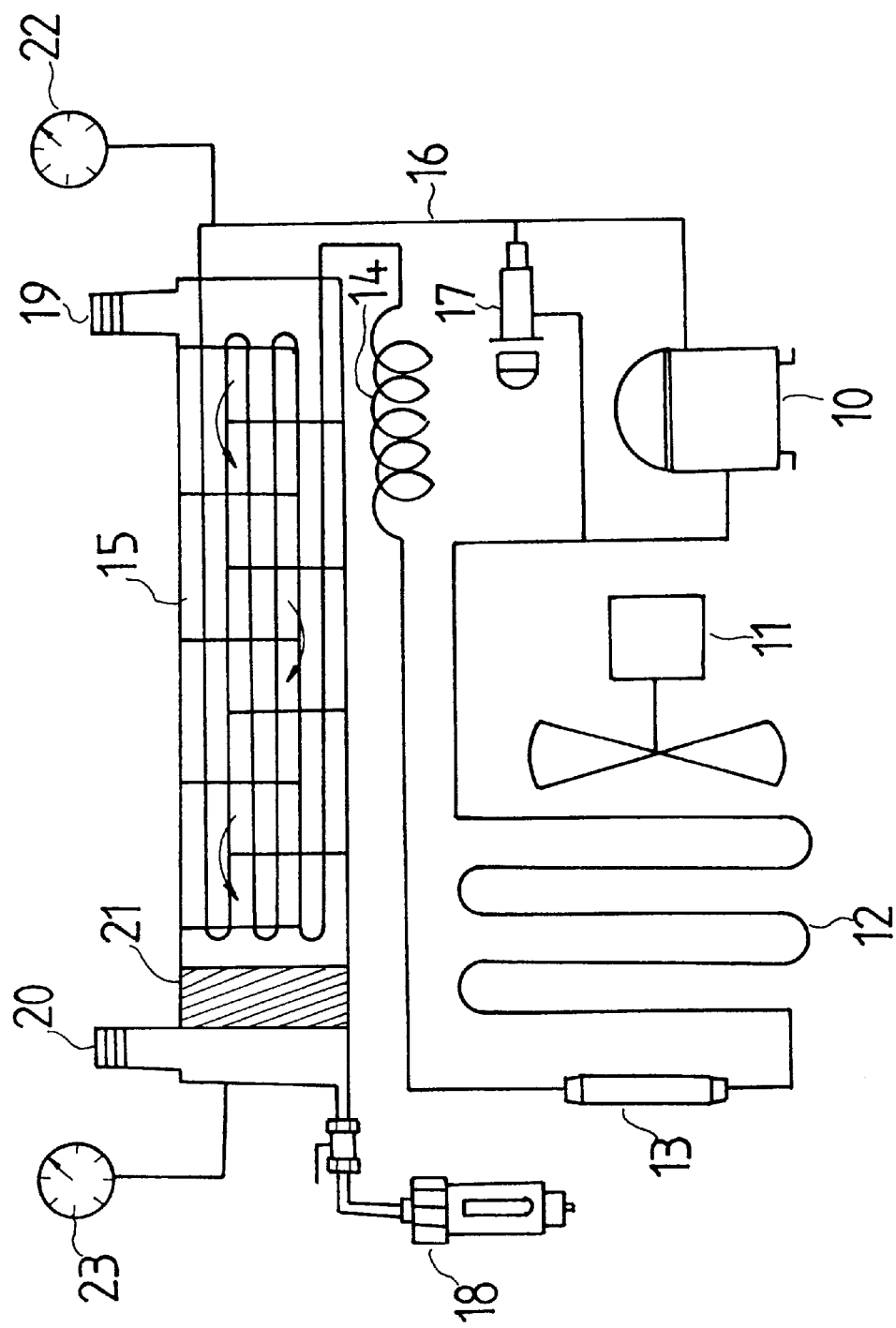
FIG. 1A is a schematic illustration showing the configuration of the conventional air cooling and drying apparatus.
Figure 2:
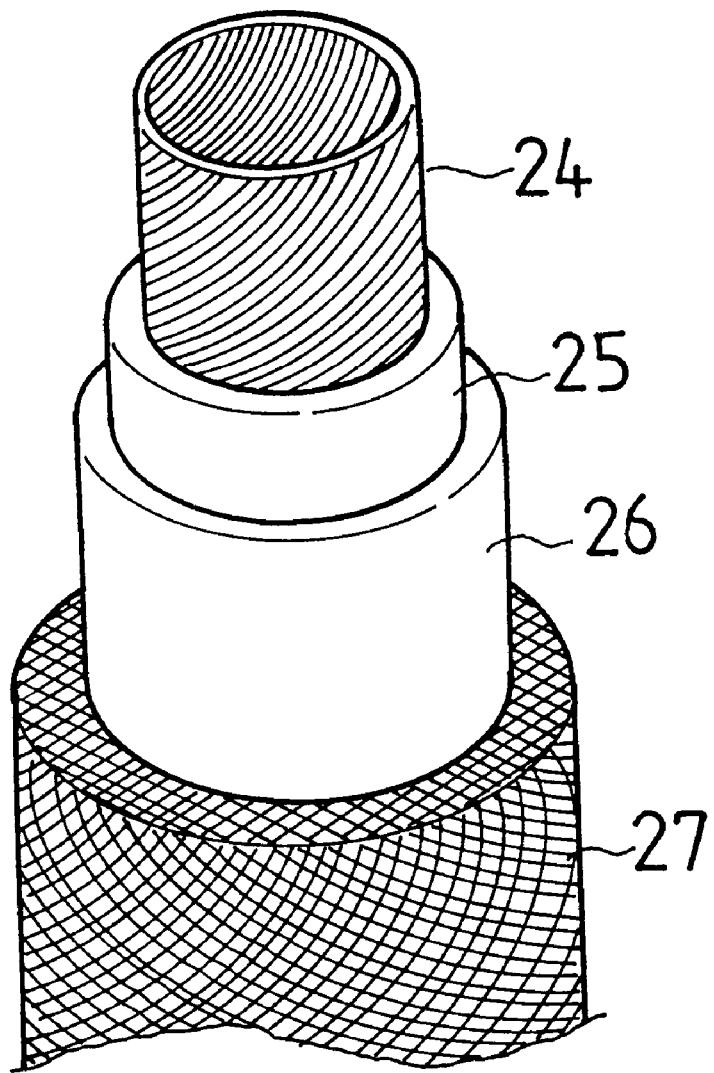
FIG. 2 is a perspective view of the conventional filter core.
Figure 3:
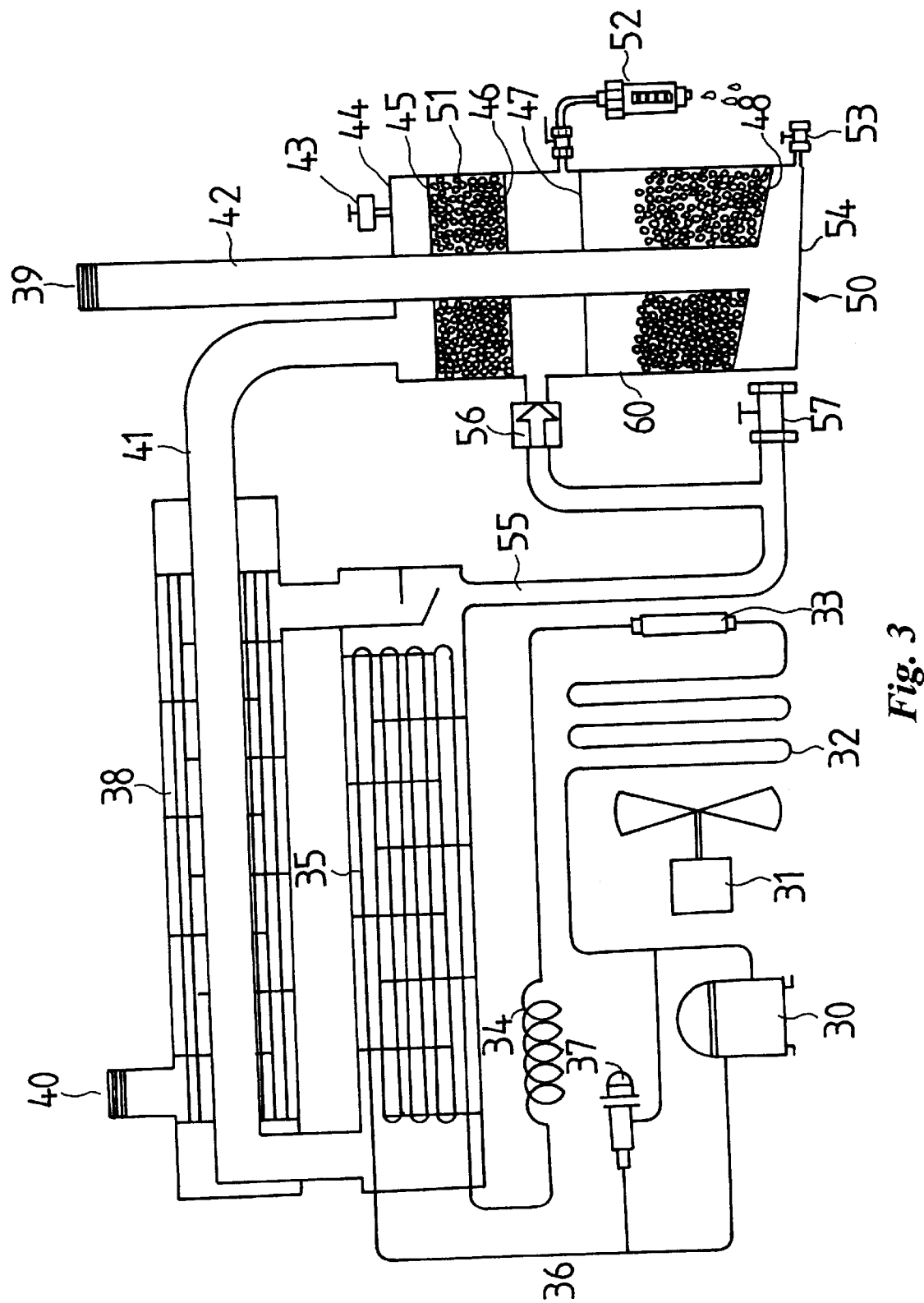
FIG. 3 is a schematic illustration showing the configuration of the present invention.

Referring to FIG. 3, the present invention includes a cold-producing medium compressor 30, a fan motor 31, a condenser 32, a cold-producing medium filter 33, a capillary 34, an evaporator 35, a cold-producing medium return conduit 36, a hot-gas by-passing valve 37, an air inlet 39, an admitting pipe 42, a water intake apparatus 43, a strainer 50, an automatic drainer 52, two manual drainers 53, 57, an escape pipe 41, a heat-exchanger 38, an air outlet 40, a U-shaped pipeline 55 and a check valve 56.

The strainer 50 consists of a strainer main trunk 60, an admitting pipe 42 extending centrally into the inside of the main trunk 60, the bottom end being near the bottom 54. The water intake apparatus 43 is coupled to a side of the top end 44 of the main trunk 60, and the escape pipe 41 is coupled to the other side of the top end 44, providing a connection to the heat-exchanger 38. A pair of parallel filter baffle plates 45 and 46 are located in the upper half of the main tank 60, each filter baffle plate 45, 46 having many fine holes uniformly formed therein. The space between the two parallel baffle plates 45 and 46 is filled with many fine pills 51. There is another pair of filter baffle plates 47 and 48 provided in the inside of the lower half of main trunk 60. The lower plate 48 is inclined with respect to the plate 47, and there is a proper amount of the fine pills 51 filled in between the baffle plates 47 and 48. The automatic drainer 52 is connected to one side of the main trunk 60 at an appropriate position thereon, and a manual drainer 53 is located nearing the bottom 54. On the other side of the strainer, the check valve 56 connects the U-shaped pipeline 55 to the evaporator 35, and a manual drainer 57 is coupled to the bottom portion of the U-shaped pipeline 55.

Still referring to FIG. 3, the cold-producing medium loop of the present invention takes advantage of the cold-producing medium compressor 30 outputting the cold-producing medium, passing it through the condenser 32, the filter 33, the capillary 34, the evaporator 35, and via the cold-producing medium return conduit 36 returning to the compressor 30. The air loop guides the compressed air entering the strainer 50, via the air inlet 39 and the admitting pipe 42, to be split into many fine streams by the filter baffle plate 48, so that a multitude of small bubbles are generated to increase the contact area between the air and the water. The oil carried by the air floats on the surface of the filter water, dirt dissolved into the water and contaminants are deposited on the bottom 54. When the air rising through the inside of the strainer is filtered by the water and the pills, and the cleaned air passes through the baffle plate 46, pills 51 and the baffle plate 45 to enter the escape pipe 41, then the cleaned air flows into the evaporator 35, wherein the air will be cooled by the cold-producing medium, and will free moisture to produce low-temperature dry air and water. The low-temperature dry air rises into the upper portion of the heat-exchanger 38 to flow out through the air outlet 40. Meanwhile, the condensed water will be conducted into the U-shaped pipeline 55. When the stored water in the U-shaped pipeline 55 reaches a certain high level, it will be drawn off back into the strainer 50 through the check valve 56, to keep the levels of the two ends of the U-shaped pipeline 55 at the same level. When the filter water in the strainer gets to a certain level, the draining standard level, the automatic drainer 52 will start to draw off the oil floating on and the water automatically, and the dissolved dirt and the deposited contaminants can be drained off the bottom 54 by opening the manual drainer 53 by hand.

Referring to FIG. 3, after draining the water and contaminants, the strainer 50 of the present invention will be charged or recharged with water, by the water intake apparatus 43 compensation, to thereby wash out contaminants from the pills that deposit at the bottom 54. The deposited contaminants on the bottom portion of the U pipeline 55 are drained out through the manual drainer 57.

Figure 4:
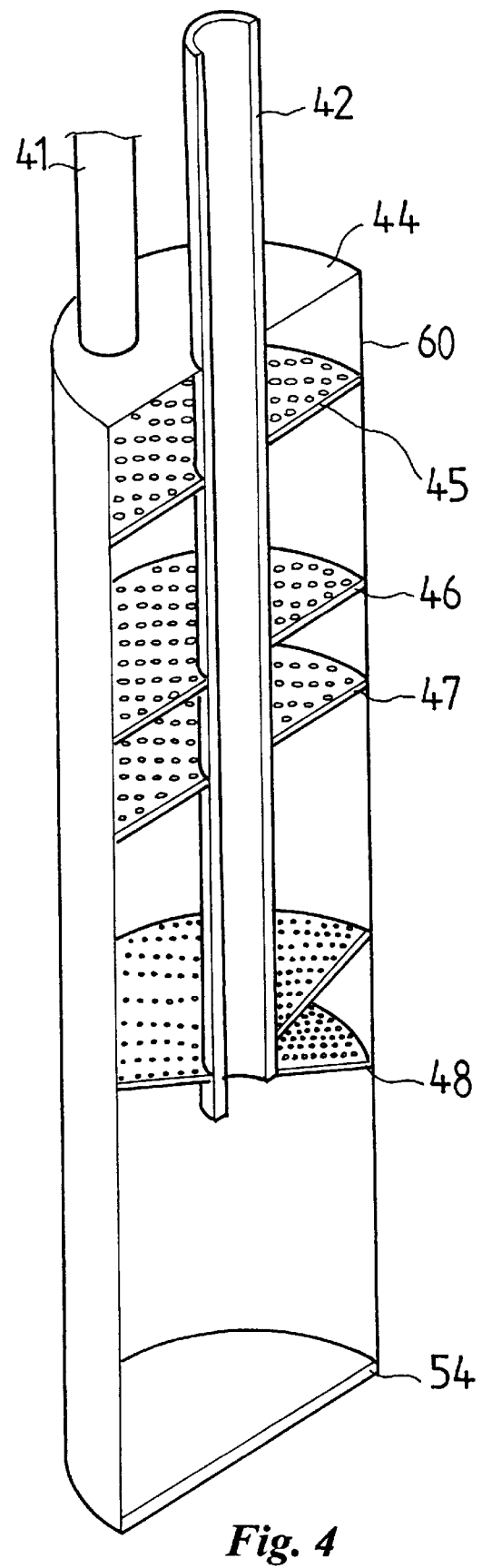
FIG. 4 is a cut-away view showing the structure of the strainer of the present invention.

Referring additionally to FIG. 4, the main trunk 60 of the present invention, as shown in the drawings, has a nipple air inlet 39 at the top end of the admitting pipe 42 for connecting to the output pipe of the air compressor. Four baffle plates 45, 46, 47, 48 welded to the inside of the main trunk 60, respectively, so that the bottom end of the admitting pipe 42 is welded to the lowest baffle plate 48. The baffle plate 48 is inclined within the main trunk 60.

Referring to FIG. 5 and FIG. 5A, in order to prevent a spray from raising that is stirred up by the rising, the upper filter portion, between baffles 45 and 46, is filled up with the fine pills 51. Meanwhile, the lower portion, between baffles 47 and 48, is not filled up with the pills 51, providing a space for the pills to move in. Due to the slant of the lowest baffle plate, the fine pills piled on it will create a tilting force along the slant to make the contaminants tend to collect on the bottom, so they can be drained out smoothly, as shown on FIG. 5A.

Referring to FIG. 6, and FIG. 6A, the action of pills in filtering contaminants is shown. When a contaminant 90 sticks the gaps between the pills 511, the rising air will upset the balance of the pills and cause them to go into a rolling movement. The rolling movement of the pills displaces the contaminants, so that the contaminants fall down to the bottom of the strainer.

Figure 7:
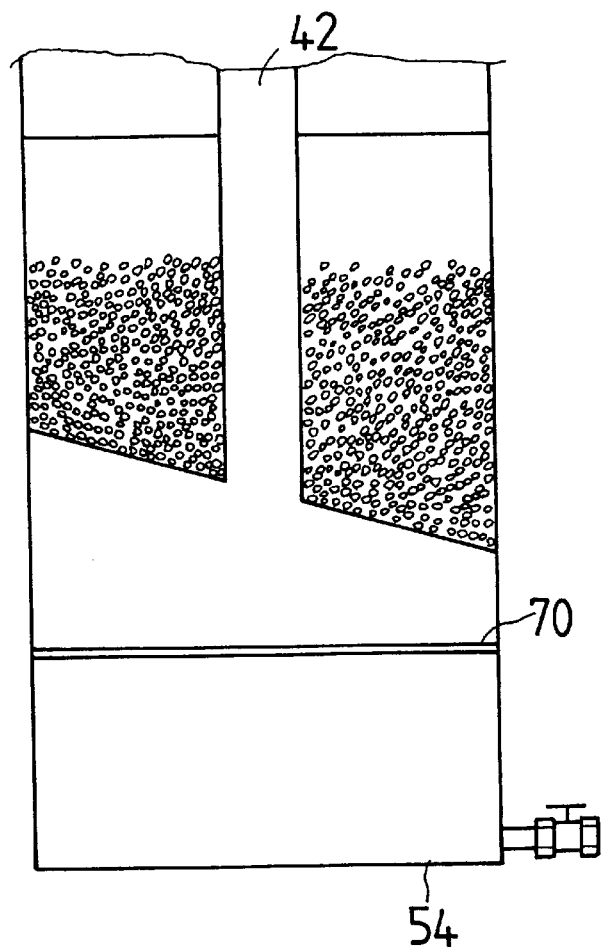
FIG. 7 is a cross-sectional view of the strainer of the present invention.
Figure 7A:
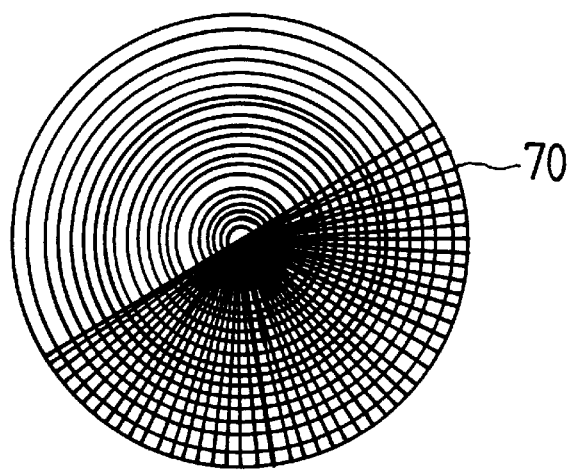
FIG. 7A is a top view of FIG. 7 showing the screen of the present invention.

Referring to FIGS. 7 and 7A, a better operation of the present invention is shown, in which a screen 70 is located below the outlet end of the admitting pipe 42, to avoid the high-pressure compressed air from striking the bottom 54 with such force that the deposited contaminants on the bottom 54 are raised. The screen 70 is also used to pre-split the air current into many fine bubbles, and allows the height of the main trunk of the strainer to be shortened. Referring to FIG. 8 and FIG. 8A, the original screen 70 as shown on FIG. 7A is a flat screen, but a version of the screen 80 is shown on FIG. 8, in which a round retainer 81 is built on the centre. The round retainer 81 can be a flat disc, as shown on FIG. 8A, or a disc with a semi-spherical portion 82 at the centre as, shown on FIG. 8B.

I claim:

1. A compressed air strainer and drying treatment apparatus, comprising a strainer having an air inlet coupled to a source of compressed air and an outlet coupled to an evaporator and a heat exchanger, said strainer including:
   (a) a main trunk;
   (b) an air admitting pipe extending from said air inlet into said main trunk;
   (c) a water intake apparatus coupled to a top end of said main trunk for admitting a predetermined quantity of water;
   (d) an escape pipe having one end coupled to said outlet of said strainer at said top end of said main trunk and an opposing end portion extending through said heat exchanger and coupled to said evaporator;
   (e) an automatic drainer and a manual drainer respectively coupled to a side of said main trunk, said automatic drainer automatically opening when a water level within said main trunk reaches a predetermined level, said manual drainer being opened to drain oil, dirt, and contaminants from said strainer;
   (f) two pairs of filter baffle plates secured internal to said main trunk, a first pair of said filter baffle plates being located in an upper half portion of said main trunk in spaced parallel relationship and a second pair of said filter baffle plates being located in a lower half portion of said main trunk, a lowest most filter baffle plate of said second pair of filter baffle plates being disposed on an incline, compressed air flowing from said admitting pipe being split into a plurality of fine streams by said second pair of filter baffle plates to generate a multiplicity of small air bubbles and thereby increase a contact area between the air and water in said main trunk;
   (g) a first plurality of pills substantially filling a space between said first pair of filter baffle plates;
   (h) a check valve coupled to a side portion of said main trunk; and, (i) a U-shaped pipeline having one end coupled to said evaporator and another end coupled to said check valve for supplying condensate to said main trunk;

said evaporator having an air outlet coupled in open communication to said heat exchanger for thermal exchange with compressed air flowing through said escape pipe.

2. The compressed air strainer and drying treatment apparatus as recited in claim 1 further comprising a second plurality of pills disposed on said inclined lowest most filter baffle plate.

3. The compressed air strainer and drying treatment apparatus as recited in claim 2 where each of said first and second pluralities of pills has a ball-shape to promote rolling thereof.

4. The compressed air strainer and drying treatment apparatus as recited in claim 1 where said U-shaped pipeline includes a manual drainer coupled to a bottom portion thereof for draining water and sediment therefrom.

5. The compressed air strainer and drying treatment apparatus as recited in claim 1 where said strainer includes a screen located in said main trunk below a distal end of said air admitting pipe for substantially avoiding high pressure compressed air striking a bottom portion of said strainer.

6. The compressed air strainer and drying treatment apparatus as recited in claim 5 where said screen has a centrally disposed disc welded thereto as a retainer.

7. The compressed air strainer and drying treatment apparatus as recited in claim 6 where said retainer has a centrally located semi-spherical portion.

* * * * *